3,168,424
MANUFACTURE OF COMPOSITE PLASTIC BOOK
COVER AND PRODUCT OBTAINED
Mortimer S. Sendor, 80—30 221st St.,
Queens Village, N.Y.
Filed Feb. 12, 1960, Ser. No. 8,345
5 Claims. (Cl. 156—244)

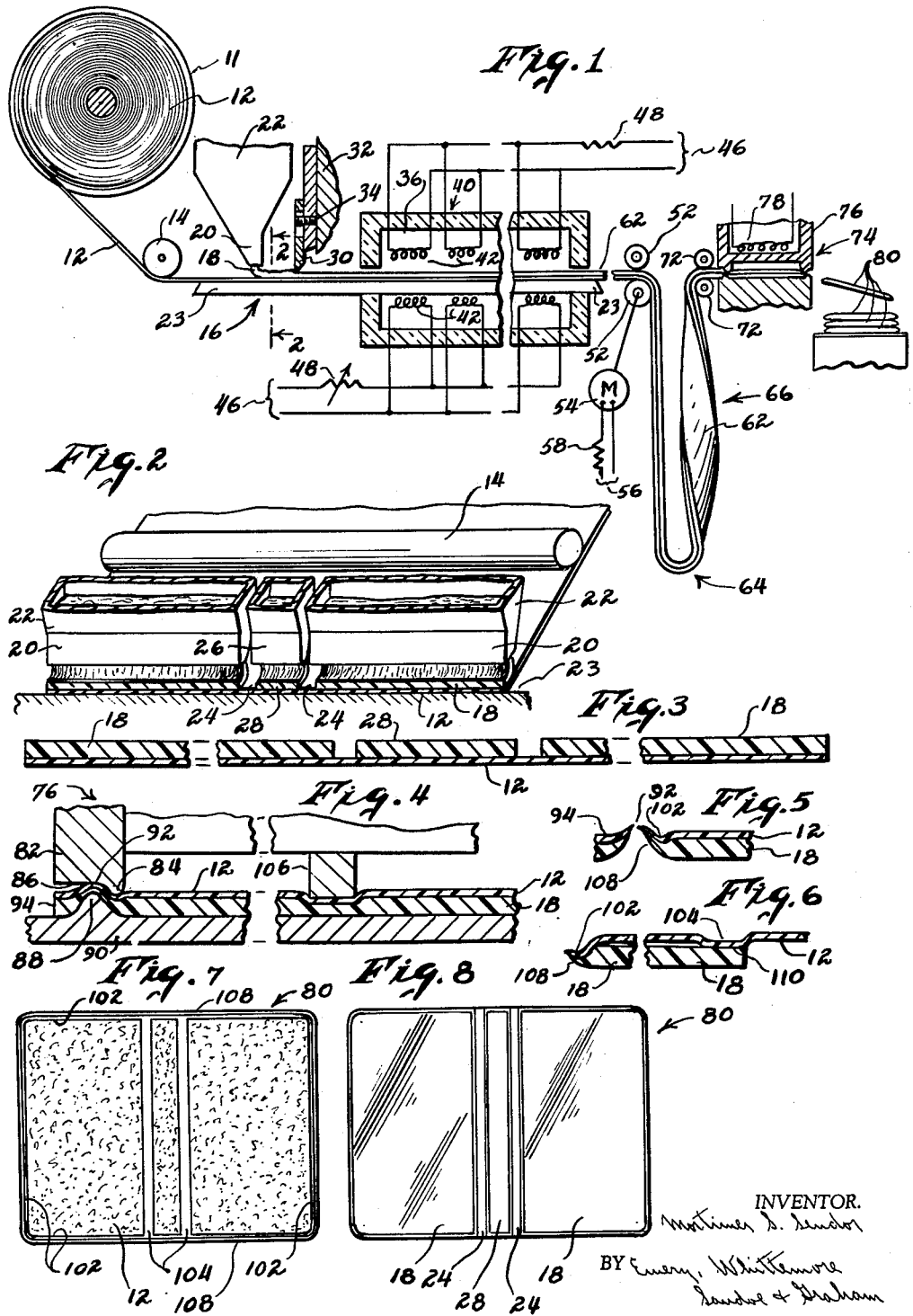
Feb. 2, 1965  M. S. SENDOR  3,168,424
MANUFACTURE OF COMPOSITE PLASTIC BOOK COVER AND PRODUCT OBTAINED
Filed Feb. 12, 1960
INVENTOR.
Mortimer S. Sendor
BY Emery, Whittemore,
Sandoe & Graham
ATTORNEYS 3,168,424
Patented Feb. 2, 1965

This invention relates to plastic book covers and to methods of making them.

One of the problems in the binding of books is in keeping the cost low. Plastic covers have been expensive, and it is an object of this invention to provide a more economical plastic cover. Plastic sheets with attractive surface decoration, such as the surfaces obtained on grained leather, are available in various kinds of plastic material. If the sheet is thin, it is not sufficiently stiff to make a good book cover; and the heavier sheets or webs are too expensive, and have to have special treatment to obtain the necessary flexibility at the regions where the front and back panels of the cover are hinged to the connecting portion that extends across the back of the book.

This invention takes advantage of the decorated thin plastic web or sheet material that is available, and makes a plastic book cover using this sheet material in a composite construction having inexpensive other plastic material bonded to the sheet and covering the parts of the book cover that comprise the front and back panels of the cover.

The other plastic is bonded to the plastic sheet by heat sealing along at least the top, bottom and front edge regions of each panel. In the preferred construction, the other plastic material is bonded to the sheet over the entire areas of the front and back panels.

Other objects, features and advantages of the invention will appear or be pointed out as the description proceeds.

In the drawing, forming a part hereof, in which like reference characters indicate corresponding parts in all the views:

FIGURE 1 is a diagrammatic view showing the method of this invention for making plastic book covers;

FIGURE 2 is a fragmentary sectional view of the apparatus shown in FIGURE 1, the section taken on the line 2—2 of FIGURE 1;

FIGURE 3 is a greatly enlarged sectional view, partly broken away, showing the sheet material of the other views with the other plastic applied thereto;

FIGURE 4 is a greatly enlarged, fragmentary view showing the way in which the edge portions of a book blank are formed by the application of heat and pressure to edge regions of the composite plastic material;

FIGURE 5 is a sectional view, of a portion of structure shown in FIGURE 4, and illustrates the way in which the book cover blank is severed from the remainder of the material along a thin line of severance formed by the process shown in FIGURE 4;

FIGURE 6 is a fragmentary sectional view through the finished cover, but showing a modified construction from that illustrated in FIGURE 5;

FIGURE 7 is a view, on a reduced scale, showing the outside of the book cover made in accordance with the method illustrated in the preceding figures; and FIGURE 8 is a view showing the inside of the book cover illustrated in FIGURE 7.

FIGURE 1 shows a spool 11 on which is wound a long web or sheet of plastic material 12. The sheet 12 passes around a guide roller 14 to a feeding station 16 at which other and flowable plastic material 18 is flowed onto the top surface of the sheet 12. This other plastic 18 flows from a nozzle 20, and other nozzles behind it, at the bottom of a supply hopper 22.

At the feeding station 16 and beyond, the sheet 12 travels along a supporting table 23. The flowable plastic 18 is flowed onto the top surface of the sheet 12 across a substantial part of the transverse width of the sheet 12.

FIGURE 2 shows two nozzles 20 with wide discharge outlets capable of applying the flowable plastic 18 to the surface of the sheet 12 along a substantial area extending inwardly from opposite edges of the sheet material 12. In practice, the nozzles 20 are of substantially the width desired for the front and back panels of the cover, and there is a region between these covered areas where the sheet material 12 is left uncovered so as to have a thin section which is suitable for providing the hinge regions on which the front and back panels swing when opening and closing the book.

In the construction illustrated in FIGURE 2, there are two hinge regions 24, and there is a small center nozzle 26 which flows a center band 28 of other plastic over the top surface of the sheet 12. In other book constructions, where it is not important to have the back portion of the cover stiff, the nozzle 26 is omitted and the sheet 12 is left uncovered all the way from the right hand nozzle 20 to the left hand nozzle 20.

The sheet 12 is unwound from the spool 11 (FIGURE 1) with the decorated surface of the material 12 on the bottom side. Thus the decorated side of the sheet 12, which will form the outside surface of the book cover, is in contact with the supporting table 23, and all of the coating plastic 18 is applied to what will become the inside surface of the book cover.

The flowable plastic 18, which flows from the hopper 22, is a plastisol; this term being used in a broad sense to designate a plastic material, with or without other ingredients, which will flow as a viscous liquid. The material may be polyvinyl chloride with appropriate plasticizers or may be polyvinyl acetate or various other known plastics. Solvents may be used to provide the desired degree of viscosity and the other plastic may be a liquid mixture formed of ground plastic material. It may also consist of a monomer compounded with sufficient ground polymer and/or other material to provide a liquid which is viscous enough so as not to run off the areas to which it is applied on the surface of the plastic sheet 12.

Ordinarily the plastisol is soft enough to spread flat on the plastic sheet material 12; but where necessary, a doctor blade 30 can be used above the plastic sheet 12 for smoothing the flourable plastic 18 and for controlling the thickness of the coating.

The doctor blade 30 is attached to a fixed support 32 by a screw 34 extending through a slot in the doctor blade. This slot is merely representative of means for controlling the height of the doctor blade 30 with respect to the underlying sheet 12.

Beyond the feeding station 16, the support 23 extends through a heating zone 36 which is illustrated as a furnace 40 having heating coils 42 both above and below the support 23, for applying heat to both sides of the composite web of plastic which passes through the furnace. The heating coils 42 are electric and are supplied with current from power lines 46 having adjusting means 48 for changing the power flow to regulate the heat. The heat applied above the support 23 can be controlled independently of that supplied below the support, and for some materials heat above the composite web is sufficient.

The heat in the furnace 40 is controlled so as not to injure the plastic sheet 12. The heat in the furnace is sufficient to cure the other plastic 18. The expression "cure" is used herein in a broad sense so as to also cover the fusing of polyvinyl chloride, and is to be taken as the step required to bring the plastic material 18 to a stable, solidified condition. In the preferred embodiment of the invention, the other plastic 18 bonds to the plastic sheet 12 over the entire area of contact of the other plastic 18 with the sheet 12.

When the kind of material used and the method of operation is such that the plastic 18 forms a solid layer over the sheet 12, without actually bonding to the material, the plastic 18 is heat sealed to the plastic sheet 12, in a manner which will be explained; but it should be understood that the expression "heat sealed" is used herein in a broad sense to cover not only the conventional practice of forcing plastic surfaces together under sufficient pressure and heat to cause them to bond, but also to cover the bonding of the plastic 18 to the plastic sheet 12 in the process of hardening and/or curing.

The composite web, consisting of the plastic sheet 12 and the plastic 18, is advanced with continuous motion by feed rollers 52 between which the composite web passes beyond the furnace 40. It is these feed rolls 52 which unwind the sheet 12 from the spool 11. The feed rolls 52 are driven by a motor 54, which receives current from a power line 56 through a speed controller 58. The composite web beyond the furnace 40 is indicated by the reference character 62.

Beyond the feed rolls 52 there is preferably a loop 64 formed in the composite web 62 and as the web 62 comes up from the loop 64 it turns through a half turn at the location 66 on its way to feed rolls 72 which are preferably used to advance the composite web with a step-by-step motion to a pressure station 74. Because of the half-turn of the composite web at the location 66, the web 62 comes across the pressure station 74 with the decorated side of the plastic sheet 12 uppermost.

A heated head 76 is brought down into contact with the composite web 62 to heat seal the edges of the plastic 18 to the plastic sheet 12, if not already bonded to it by the previous operations, and in any event to form a very thin tear line around the outline of a cover blank. The head 76 is heated in any suitable manner, as by a coil 78. The blanks formed by the pressure head 76 are severed from the composite strip and are indicated by the reference character 80.

FIGURE 4 shows the operation of the pressure head 76. It has a rim 82 with a lip 84 for impressing a decorative channel in the surface of the sheet 12 near the edge of the material. The rim 82 also has a pressure face or abutment 86 confronting a ridge 88 on a fixed supporting table 90. The pressure face 86 and the ridge 88 are so close together, at the end of the stroke of the pressure head 76, that substantially all of the plastic between the abutment 86 and the ridge 88 is caused to flow from between the parts and this leaves a very thin film of plastic along a tear line 92. Waste material 94, outside of the tear line 92, is torn away from the rest of the material as indicated in FIGURE 5.

The pressure head 76, and the ridge 88, are shaped to outline the cover blank 80, best shown in FIGURES 7 and 8. The channel formed by the lip 84 is indicated in FIGURE 7 by the reference character 102. Other decorative channels 104 along the hinge areas of the cover, may be formed at the same time by a ridge 106 (FIGURE 4) on the heated pressure head 76.

FIGURE 8 shows the inside surface of the cover blank 80 with the areas of the other plastic material 18 covering the inside surfaces of the front and back panels of the book cover; and the band 28 of other plastic material along the connecting portion of the cover which overlies the back of the book. The uncovered hinge regions 24 of the cover blank are also indicated in FIGURE 8. Ordinarily the channels formed in the outside surface of the cover are not visible or are only slightly visible on the inside, and they are not indicated in FIGURE 8. There is a slight bevel to the edge region 108 around the entire periphery of the cover blank 80; this bevel edge portion being the result of the displacement of material by the ridge 88 (FIGURE 4).

In FIGURE 5, the other plastic 18 is shown bonded to the sheet 12; but in FIGURE 6 this is not the case. The other plastic material 18, on top of the sheet 12 is, however, heat sealed to the sheet 12 along the channel 102 and around the region of the tear line 92. It will be understood that this region of heat sealing will extend around the peripheral edge of the cover blank along the entire front edge and also along the top and bottom edges as far as the other plastic 18 extends. Where other decorative channels, such as the channels 104 are impressed in the cover blank at the hinge regions of the cover blank, the pressure applied for these channels 104 can also be used for heat sealing the other plastic 18 to the plastic sheet 12 as shown at the location 110 in FIGURE 6.

The preferred embodiment and one modification of the invention have been shown and described, but other changes and modifications can be made and some features can be used in different combinations without departing from the invention as defined in the claims.

What is claimed is:

1. A method of making plastic book covers which comprises advancing a web of plastic flexible material in the direction of the length of the web and with continuous motion and in a substantially horizontal direction for a portion of the travel of the web, supporting the web in a substantially flat condition both longitudinally and transversely of its extent along said portion of the travel, flowing onto substantially horizontal portions of the thus supported portion of the web at least two separate coatings of plastic that extend continuously longitudinally of the web but over areas spaced from one another transversely of the web by an intermediate area of the web, controlling the thickness of the web, hardening the coating while on said supported portion of the web to impart a stiffness to the coating for making stiff and flat front and back covers for a book, bonding the coatings to the web along at least the edge regions of the coated area to form a multi-layer and stiffened construction over the coated portions of the web, and severing the coated web at locations spaced from one another by predetermined distances along the length of the coated web to make successive book covers each of which has front and back panels formed by the coated portions of the sheet and with the mid portion of the cover formed by the intermediate area of the sheet between the coated portions.

2. The method described in claim 1 and in which said flowable plastic material is flowed on the sheet in a liquid condition and hardens on the sheet as the sheet travels beyond the feeding station.

3. The method described in claim 2 and in which the flowable material is at least partly a monomer and the thickness of said flowable material on the web is controlled by striking off the top of said material at an adjustable height depending upon the desired thickness of the front and back panels of the book cover, and the plastic sheet with the flowable plastic material thereon continues its motion beyond the location of the strike-off step and is passed through a zone of heating to cure the flowable plastic material.

4. The method described in claim 1 and in which heat and pressure are applied to the composite web formed by the plastic sheet and flowable plastic material, and such heat and pressure are applied to form a tear line where the material is compressed to a very thin section along a continuous line around an area which outlines a book cover blank, and then tearing the cover blank loose from the remainder of the composite web along said continuous line.

5. The method described in claim 4 and in which heat and pressure are applied to the composite web to impress a decorative band on the outside of the cover and in the same operation with the heat and pressure that compresses the composite web to form the tear line.

References Cited in the file of this patent

UNITED STATES PATENTS

| | | |
|---|---|---|
| 2,054,448 | Russell | Sept. 15, 1936 |
| 2,390,125 | Schade | Dec. 4, 1945 |
| 2,641,484 | Brody | June 9, 1953 |
| 2,702,769 | Alderfer | Feb. 22, 1955 |
| 2,815,308 | Robinson et al. | Dec. 3, 1957 |
| 2,944,586 | Yanulis | July 12, 1960 |
| 3,033,257 | Weber | May 8, 1962 |

FOREIGN PATENTS

| | | |
|---|---|---|
| 724,987 | Great Britain | Feb. 23, 1955 |